United States Patent [19]

Staub, Jr.

[11] 3,957,948

[45] May 18, 1976

[54] METHOD OF CONTROLLING OXYGEN GENERATION AND $CO_2$ REMOVAL IN A CLOSED CHAMBER

[75] Inventor: Charles H. Staub, Jr., Pittsburgh, Pa.

[73] Assignee: Mine Safety Appliances Company, Pittsburgh, Pa.

[22] Filed: Sept. 29, 1972

[21] Appl. No.: 293,309

[52] U.S. Cl. .................................... 423/230; 98/1

[51] Int. Cl.[2] .................... C01B 31/20; C01B 13/02

[58] Field of Search ........... 423/210, 220, 230, 224; 23/288 F

[56] References Cited

UNITED STATES PATENTS

| | | | |
|---|---|---|---|
| 928,978 | 7/1909 | Jaubert | 23/288 F |
| 2,121,034 | 6/1938 | Hausman | 23/281 |
| 3,148,034 | 9/1964 | Bovard et al. | 423/230 |
| 3,410,191 | 11/1968 | Jackson | 423/230 |

OTHER PUBLICATIONS

Jackson et al., "Atmosphere Control", Aero/Space Engineering, May, 1960, pp. 40, 41, 94, 96.

*Primary Examiner*—Oscar R. Vertiz
*Assistant Examiner*—Brian E. Hearn
*Attorney, Agent, or Firm*—Brown, Murray, Flick & Peckham

[57] ABSTRACT

All of a predetermined number of original air purifying air-oxygen generating canister units have a useful life of substantially the same number of hours. Each unit is designed to generate oxygen at an initial rate of at least half of what is required to support life in a closed chamber in which the canisters are to be used, but at a rate less than required. First, two of the canister units are inserted together in an air-circulating system in the chamber and then the remaining canister units are connected in the system in succession at time intervals substantially equal to said number of hours divided by the number of original canister units. One of the two original units is replaced by a replacement unit at a time before the expiration of said number of hours substantially equal to one of said time intervals. Each of the remaining original units in succession then is replaced by a replacement unit at substantially regular intervals just before the expiration of the life of the unit being replaced.

4 Claims, 1 Drawing Figure

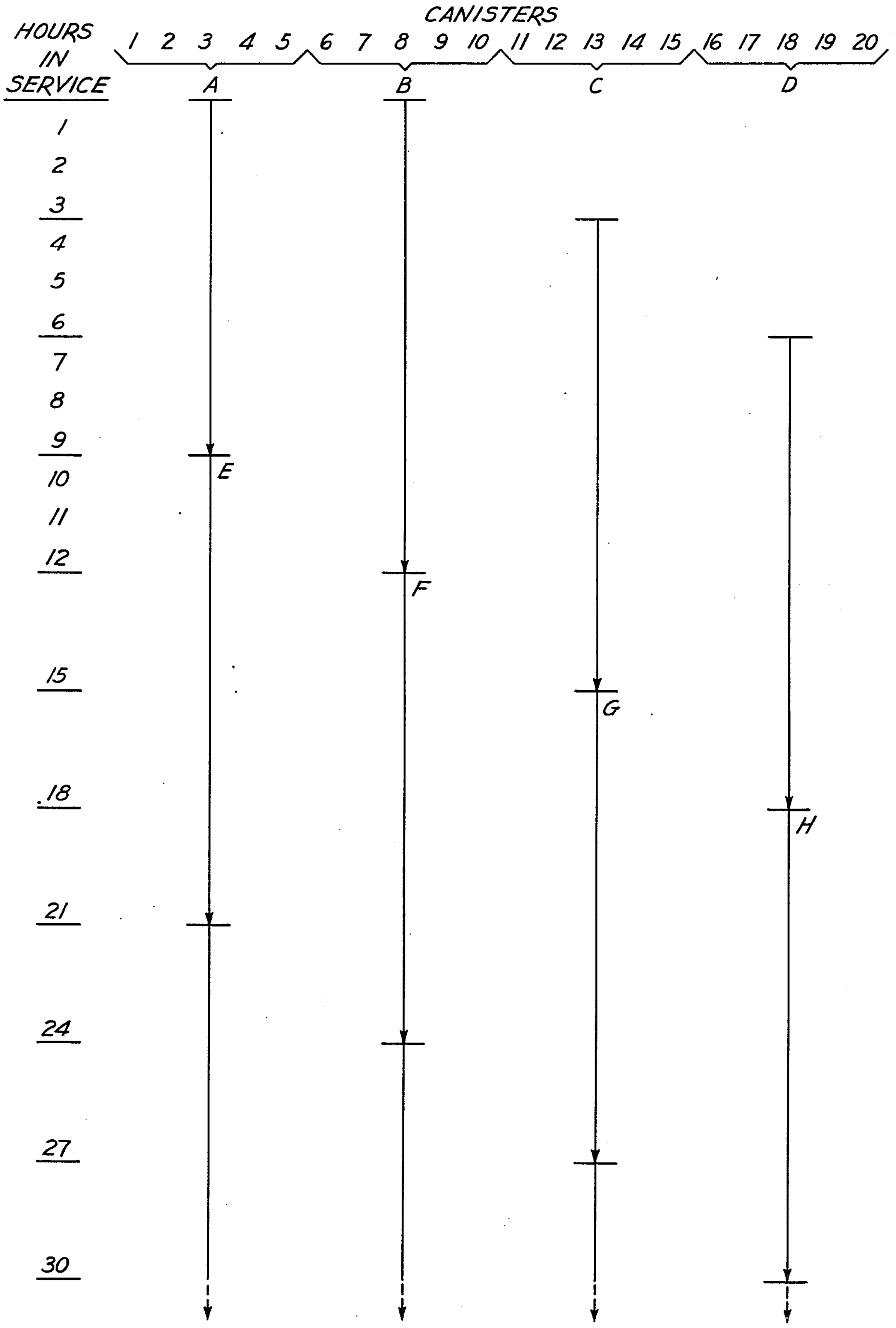
HOURS IN SERVICE
CANISTERS
1 2 3 4 5 6 7 8 9 10 11 12 13 14 15 16 17 18 19 20
A
B
C
D
1
2
3
4
5
6
7
8
9
10
11
12
15
18
21
24
27
30
E
F
G
H

METHOD OF CONTROLLING OXYGEN GENERATION AND $CO_2$ REMOVAL IN A CLOSED CHAMBER

In closed chambers, such as air raid shelters and the like, where a relatively large number of people are congregated, it is necessary to remove carbon dioxide from the air and to add oxygen. This can be done by circulating the air of the chamber through canisters containing a chemical suitable for the purpose. Such a chemical usually is a superoxide such as $KO_2$, which will absorb carbon dioxide from the air flowing through it while the moisture in that air causes the chemical to generate oxygen. Over a period of time the chemical deteriorates so that its rate of oxygen generation gradually decreases. Also, the resistance of the chemical to air flow through it increases with time. If enough of the chemical canisters are placed in the circulating system to still produce the required amount of oxygen after they have been in use for several hours, it follows that during a considerable part of the time period chemical is wasted because there is a marked over-production of oxygen during the first part of the period. Then, when all of the canisters are replaced with new ones, there again is an over-production of oxygen. In other words, the rate of oxygen generation occurs in waves, there first being too much and then tapering off until replacement of the canisters is required, whereupon too much oxygen is generated again. This is not a good condition enconomically and for the people in the shelter. If it is attempted to reduce the initial over-production of oxygen by using fewer canisters, then they will have to be replaced sooner because they will more quickly reach the point where the total oxygen output is insufficient, even though there is considerable active chemical present in the canisters. This means a waste of chemical.

It is among the objects of this invention to provide a method of inserting such chemical canisters in an air circulating system which will maintain the production of oxygen and removal of $CO_2$ much more uniform than heretofore and more in accordance with the metabolic requirements of the people being served by the system, which will avoid peaks in heat generation, which will prevent pressure fluctuation, and which will greatly reduce waste of oxygen-producing chemical and therefore will be more economical.

The invention is illustrated in the accompanying diagram.

According to this invention an air circulating system is located in a closed chamber, such as an air raid shelter, a submarine or the like. The system includes a conventional blower for drawing in the air of the chamber and blowing it out through a number of valved conduits or hoses leading to canisters containing an oxygen generating chemical that also purifies the air by removing carbon dioxide from it. Each canister or group of canisters can be connected to and quickly removed from a separate hose and replaced by a like canister or group of canisters. The term "canister unit" is used herein to mean either a single canister or a group of canisters. Every group of canisters contains the same number of individual canisters.

As an example of the practice of the new method where there are approximately 225 people in the chamber just mentioned, using 1 cubic foot of oxygen per man hour and requiring removal of 0.9 cubic foot of carbon dioxide per man hour, a total of 20 chemical canisters, each containing 40 pounds of $KO_2$, are connected to 20 hoses and are functioning after the first few hours of operation of the system. Air is blown through these canisters at the rate of 30 c.f.m. All of them have a useful life of substantially the same number of hours; for example, 12 hours. Canisters of a different size would have a longer or shorter life. Half of the canisters will be necessary for generating the amount of oxygen required in the chamber while the canisters are fresh. It follows that a group of only five canisters will not produce enough oxygen to meet requirements, but nevertheless will generate oxygen at an initial rate of at least half of what is needed. The 20 canisters are divided into four groups or canister units of five canisters each.

After the chamber has been closed with the recited number of people in it, nothing needs to be done with the air circulating system until the oxygen in the chamber starts to become depleted below an acceptable level. Then, with two of the canister units (10 canisters) connected to the required number of hoses in the system the blower is started in operation. The air pumped through the canisters by the blower will be purified ($CO_2$ removed) and oxygen will be produced and added to the air in the known manner. At regular intervals after the system starts operating, the remaining two canister units, each again consisting of five canisters, are placed on stream in the system by connecting them to the system hoses. The time at which this should occur is determined by dividing the life in hours of a canister by the number of canister units. In the example being considered, with the life of a canister estimated to be 12 hours and with four original canister units, fresh units should be added to the system about every 3 hours. Thus, the third unit is added at the end of 3 hours and the remaining fourth unit is connected into the system at the end of 6 hours. This places all 20 of the original canisters in circuit, which now requires the presence of 20 canisters as long as the system continues to operate, due to the varying degrees of exhaustion of the chemical in the different canister units.

In order to maintain a full complement of 20 canisters, a supply of replacement canister units is provided. These are like the original canister units. Nine hours after the first 10 canisters have been placed in the system, one of the two canister units that were first inserted is removed and replaced by one of these replacement canister units. Although this is about 3 hours before the replaced unit normally would have become exhausted, there is not a great waste of chemical because during that final 3 hours the chemical would be in an advanced state of depletion anyway.

the canister units now are replaced at substantially regular intervals just before the expiration of the life of each unit being replaced. That is, the second of the two units first placed in the system will be replaced about 3 hours after the first replacement unit was connected into the system; i.e., twelve hours after this replaced second unit was put in the system. As the other canister units reach the ends of their 12 hour lives, they too are replaced by fresh units. This means that a different unit is replaced every 3 hours for as long a time as it is necessary to keep the shelter area closed. It will be seen that after the first canister unit is replaced at the end of 9 hours, replacement units are added in succession every 3 hours. Consequently, concentration of oxygen in the air of the chamber and the absorption of $CO_2$ remain fairly uniform and are not subject to the highs and lows that would occur if all canisters were replaced at the same time. Full use is made of the chemical in every canister, except the first replaced, thereby avoiding waste of chemical. Another advantage of this system is that heat production by it is substantially uniform, and pressure fluctuation due to change in gas volume is avoided. All this is done without expense to the system for added controls.

Since the rate of oxygen generation and $CO_2$ removal is dependent on the moisture and $CO_2$ content of the air passing through the canisters, as well as on the rate of air flow, it is highly desirable to maintain the humidity in the closed chamber as uniform as possible and also as low as practical, preferably from 45° to 50°F dew point. This can be done by air-conditioning the chamber or by a dehumidifier. Under such conditions canister flow resistance stays relatively constant over its entire life; the canisters do not plug up.

The system of inserting and replacing the canisters is illustrated graphically in the drawing. It will be seen that canister units A and B, each consisting of five canisters, are inserted first and at the same time. Three hours later unit C is inserted, followed 3 hours later by unit D. All 20 canisters are now connected in the system and functioning. At the end of 9 hours, canister A is removed and replaced by replacement unit E. Units, B, C and D stay in service for their full 12 hour life, so replacement unit F does not replace unit B until 3 hours after unit E was inserted. Replacement units G and H follow unit F at 3 hour intervals. The replacement units in turn can be replaced by additional replacement units at 3 hour intervals as long as necessary.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The method of controlling the rate of oxygen generation in a closed chamber in accordance with the metabolic requirements of people therein, comprising providing a plurality of original air purifying-oxygen generating canister units and replacement canister units, all of said units having a useful life of substantially the same number of hours and each unit being designed to generate oxygen at an initial rate of at least half of what is required in said chamber but less than required therein, inserting two of said original canister units in parallel in an air-circulating system in said chamber to produce sufficient oxygen for the people therein and to remove carbon dioxide, then inserting in the system in parallel the remaining original canister units in succession at time intervals substantially equal to said number of hours divided by the number of said original units, replacing one of said two original units with one of said replacement units at a time before the expiration of said number of hours substantially equal to one of said time intervals, and then replacing with said replacement units each of the remaining original units in succession at substantially regular intervals just before the expiration of the life of the unit being replaced.

2. The method recited in claim 1, including maintaining the humidity in said chamber substantially constant.

3. The method recited in claim 1, including maintaining the dew point of the air in said chamber between about 45° and 50°F.

4. A method recited in claim 1, including replacing said replacement canister units in succession at substantially regular intervals just before the expiration of the life of each.

* * * * *